US009432811B2

(12) United States Patent
De Lorenzo et al.

(10) Patent No.: US 9,432,811 B2
(45) Date of Patent: Aug. 30, 2016

(54) ESTIMATING THE LATERAL LOCATION OF A WIRELESS TERMINAL BASED ON TEMPERATURE AND ATMOSPHERIC PRESSURE

(71) Applicant: Polaris Wireless, Inc., Mountain View, CA (US)

(72) Inventors: David S. De Lorenzo, Palo Alto, CA (US); Benjamin Lipeles Segal, San Francisco, CA (US); Jian Zhu, Tustin, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 253 days.

(21) Appl. No.: 14/472,574

(22) Filed: Aug. 29, 2014

(65) Prior Publication Data

US 2016/0044464 A1    Feb. 11, 2016

Related U.S. Application Data

(60) Provisional application No. 62/033,968, filed on Aug. 6, 2014.

(51) Int. Cl.
*H04W 4/02*    (2009.01)

(52) U.S. Cl.
CPC .................. *H04W 4/025* (2013.01)

(58) Field of Classification Search
CPC ..... H04W 4/025; H04W 4/02; H04W 16/20; H04W 16/225; H04W 4/043; H04W 4/04; H04W 4/021; H04W 52/0251; H04W 64/006; H04W 48/04; H04W 64/00; H04L 29/08657; G01S 5/0257
See application file for complete search history.

(56) References Cited

U.S. PATENT DOCUMENTS

| | | | |
|---|---|---|---|
| 5,224,059 A | 6/1993 | Nitta et al. | |
| 5,652,592 A | 7/1997 | Sanderford et al. | |
| 6,518,918 B1 | 2/2003 | Vannucci et al. | |
| 6,944,465 B2* | 9/2005 | Spain | H04W 64/00 455/456.1 |
| 7,263,442 B2* | 8/2007 | Eckel | G01C 5/06 702/3 |
| 7,433,695 B2* | 10/2008 | Gordon | G01S 5/0252 455/456.1 |
| 8,938,210 B1 | 1/2015 | Otto et al. | |
| 8,990,043 B1 | 3/2015 | Kolodziej | |
| 9,119,165 B2 | 8/2015 | Krasner et al. | |
| 9,237,423 B1* | 1/2016 | Blaha, Jr. | H04W 4/025 |
| 2005/0272447 A1 | 12/2005 | Eckel | |
| 2009/0256742 A1 | 10/2009 | Kawaguchi et al. | |
| 2010/0099433 A1 | 4/2010 | Wigren | |
| 2010/0318293 A1 | 12/2010 | Brush et al. | |
| 2012/0013475 A1* | 1/2012 | Farley | G01S 5/0045 340/665 |
| 2012/0290253 A1 | 11/2012 | Barrett et al. | |

(Continued)

OTHER PUBLICATIONS

"Office Action" dated Feb. 2, 2016, issued in related U.S. Appl. No. 14/960,577.
"Final Office Action" dated May 20, 2016 in related U.S. Appl. No. 14/960,577.
Andy Walker, "Natural Ventilation", "WBDG Whole Building Design Guide ", Jun. 15, 2010, Publisher: National Institute of Building Sciences (2014), Published in: US.

(Continued)

*Primary Examiner* — Meless Zewdu
(74) *Attorney, Agent, or Firm* — Kaplan Breyer Schwarz & Ottesen, LLP

(57) ABSTRACT

A technique is disclosed for estimating the lateral location of a wireless terminal in a geographic region. The technique is based on the recognition that some three-dimensional locations of the wireless terminal are improbable, and that measurements of temperature and atmospheric pressure at the wireless terminal and outside can be used to determine which lateral locations of the wireless terminal are improbable.

34 Claims, 13 Drawing Sheets

(56) References Cited

U.S. PATENT DOCUMENTS

| | | | |
|---|---|---|---|
| 2013/0035110 A1 | 2/2013 | Sridhara et al. | |
| 2013/0217410 A1* | 8/2013 | Ku | H04W 4/008 455/456.1 |
| 2014/0135040 A1* | 5/2014 | Edge | H04W 4/028 455/456.6 |
| 2014/0274151 A1* | 9/2014 | Pattabiraman | H04W 4/043 455/456.3 |
| 2015/0133145 A1* | 5/2015 | Palanki | H04W 4/025 455/456.1 |
| 2015/0233713 A1* | 8/2015 | Wolf | G01C 5/06 702/166 |

OTHER PUBLICATIONS

Madrzykowski, et al., "Fire Fighting Tactics Under Wind Driven Conditions: Laboratory Experiments", "NIST Technical Note 1618", Jan. 2009, Publisher: The Fire Protection Research Foundation / Homeland Security, Published in: US.

CMHUI@HKU.HK, "Lecture: Air Movement and Natural Ventilation", Aug. 17, 2001, Publisher: The University of Hong Kong / Department of Agriculture (http://www.arch.hku.hk/), Published in: HK.

"Notice of Allowance", issued in parent U.S. Appl. No. 14/472,600, Sep. 25, 2015.

* cited by examiner

ESTIMATING THE LATERAL LOCATION OF A WIRELESS TERMINAL BASED ON TEMPERATURE AND ATMOSPHERIC PRESSURE

CROSS REFERENCE TO RELATED APPLICATIONS

This application is related to "Estimating the Elevation of a Wireless Terminal Based on Temperature and Atmospheric Pressure," application Ser. No. 14/472,600, which is incorporated by reference in its entirety.

This application claims the benefit under 35 U.S.C. §119 (e) to "Smartphone Absolute Altitude Estimation Using Barometer Data," Provisional Application Ser. No. 62/033, 968, which is incorporated by reference in its entirety.

This application is related to U.S. Pat. Nos. 6,518,918, 6,944,465, 7,460,505, 7,383,051, 7,257,414, 7,753,278, 7,433,695, 7,848,762, and 8,306,676, and 8,630,665, each of which are incorporated by reference.

This application is related to U.S. Patent Application Publications 2008/0077356, 2008/0077472, and 2008/0077516, each of which are incorporated by reference.

FIELD OF THE INVENTION

The present invention relates to telecommunications in general, and, more particularly, to a technique for estimating the location of a wireless terminal based on the temperature and atmospheric pressure in the vicinity of the wireless terminal.

BACKGROUND OF THE INVENTION

The salient advantage of wireless telecommunications over wireline telecommunications is the user of the wireless terminal is afforded the opportunity to use his or her terminal anywhere. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal. In accordance with some techniques, the location of a wireless terminal is estimated, at least in part, from signal measurements that are reported by the wireless terminal. The reported measurements are of signals measured by the wireless terminal that are transmitted by one or more base stations and, in some cases, by Global Positioning System (GPS) satellites. In order for these techniques to work, at least some of the transmitted signals have to be strong enough to allow for accurate measurement by the wireless terminal and for reliable processing by the particular estimation technique. Some of these techniques work well even in environments where the measured strengths of the different signals vary significantly, such as where signal obstructions are present, including natural obstructions such as mountains and artificial obstructions such as buildings.

SUMMARY OF THE INVENTION

There are many techniques in the prior art that for generating an estimate of the location of a wireless terminal, and each technique has its advantages and disadvantages.

For example, the cost of generating a location estimate—in terms of time, hardware, money, compute cycles, and energy—depends on the technique and on the quantity and quality of the empirical data. There are some techniques in which the cost of generating a location estimate is approximately constant regardless of the quantity and quality of the empirical data. This is particularly true for geometry-based techniques such as the Global Positioning System and Observed-Time-Difference-of-Arrival.

In contrast, there are some techniques in which the cost of a location estimate can vary widely based on the quantity and quality of the empirical data. This is particularly true for pattern-matching techniques such as Radio-Frequency Pattern Matching. For these techniques, it is advantageous to employ, when possible, mechanisms that lower the average (or maximum) cost of an estimate. The present invention, as recited in the claims, is one such mechanism.

The illustrative embodiment of the present invention exploits:

(i) measurements of temperature and atmospheric pressure outdoors, (ii) measurements of temperature and atmospheric pressure at the wireless terminal, and (iii) knowledge of the terrain, buildings, and other structures to both:

(i) reduce the cost of a location estimate, and (ii) improve the accuracy of the location estimate.

This is accomplished by recognizing that some estimates of the location of a wireless terminal in three-dimensional space are improbable, and that measurements of temperature and atmospheric pressure can be used to quickly and inexpensively eliminate from consideration locations that are—in a given circumstance—improbable.

For example, when a wireless terminal is known to be in downtown Washington, D.C., and a measurement of atmospheric pressure at a wireless terminal suggests that the wireless terminal is at an elevation of 180 meters above mean sea level, the illustrative embodiment can reasonably designate every possible lateral location of the wireless terminal as improbable except for the Washington Monument (whose tip is at an elevation above mean sea level of approximately 198 meters).

Thus, the illustrative embodiment improves the accuracy of the location estimate by eliminating the possibility of making an error by estimating that the lateral location of the wireless terminal as at the White House. Furthermore, the illustrative embodiment lowers the cost of the location estimate by quickly eliminating the need to expend resources to consider lateral locations other than the Washington Monument.

The illustrative embodiment comprises: A method of estimating the lateral location of a wireless terminal, the method comprising: receiving, at a data processing system, the identity of a radio signal that is received by a wireless terminal; receiving, at the data processing system, a measurement of atmospheric pressure at the wireless terminal; designating at least one of a plurality of possible lateral locations of the wireless terminal as improbable based on: (i) the measurement of atmospheric pressure at the wireless terminal; and estimating the lateral location of the wireless terminal to be one of the plurality of possible lateral locations of the wireless terminal not designated as improbable based on: (i) the identity of the radio signal.

DEFINITIONS

Figure 1:
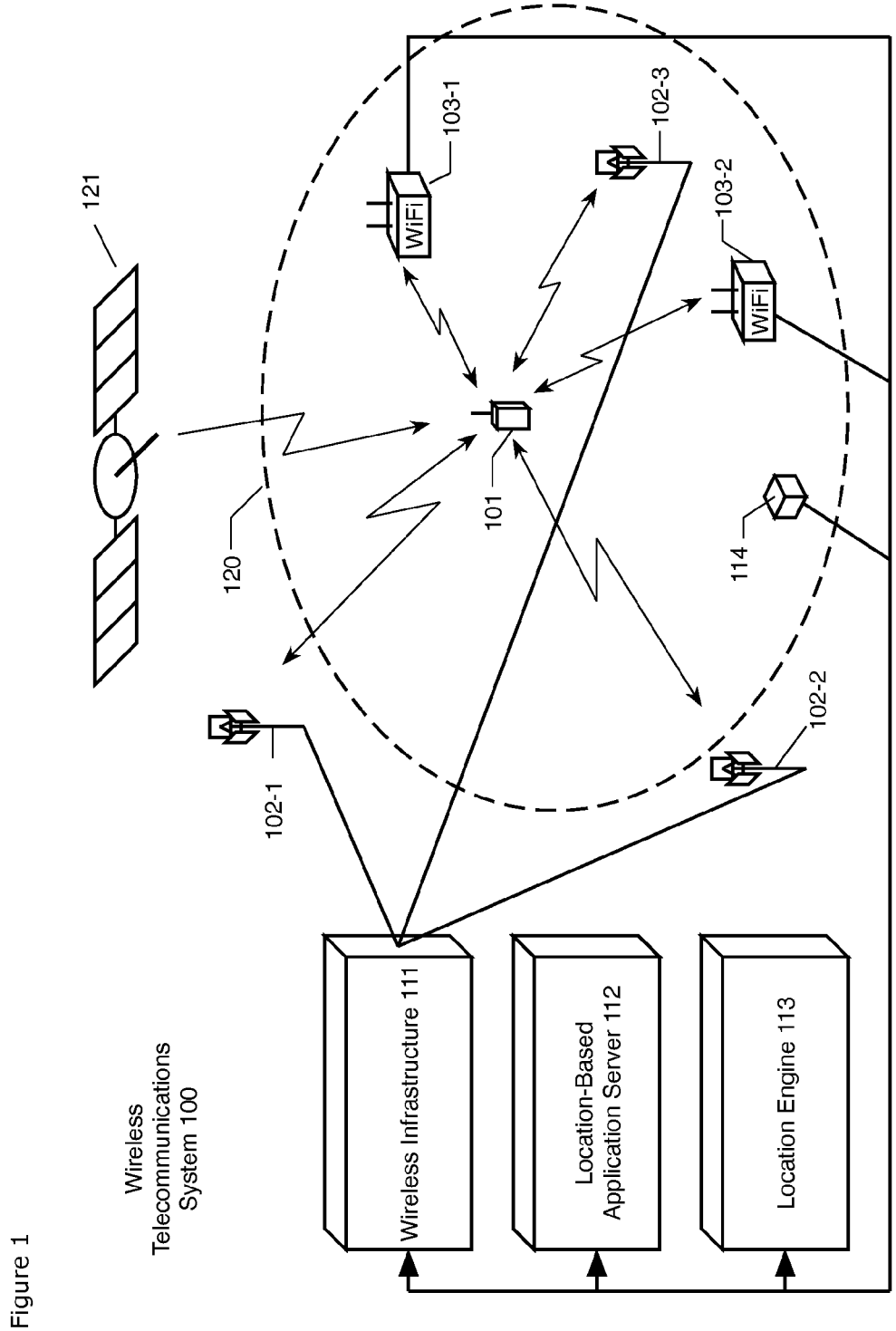
FIG. 1 depicts a diagram of the salient components of wireless telecommunications system 100 in accordance with the illustrative embodiment of the present invention.

Atmospheric Pressure—For the purposes of this specification, the term "atmospheric pressure" is defined as the force per unit area exerted on a surface by the weight of the air above that surface in the atmosphere of Earth.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Elevation—For the purposes of this specification, the term "elevation" is defined as the height above or below a fixed reference point (e.g., standard sea level, ground level, etc.).

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Height—For the purposes of this specification, the term "height" should be given the ordinary and customary meaning that the term would have to a person of ordinary skill in the art at the time of the invention.

Identity of a Radio Signal—For the purposes of this specification, the phrase "identity of a radio signal" is defined as one or more indicia that distinguish one radio signal from another radio signal.

Lateral Location—For the purposes of this specification, a "lateral location" is defined as information that is probative of latitude or longitude or latitude and longitude.

Location—For the purposes of this specification, the term "location" is defined as a zero-dimensional point, a finite one-dimensional path segment, a finite two-dimensional surface area, or a finite three-dimensional volume.

Location-Dependent Trait of a Radio Signal—For the purposes of this specification, the term "location-dependent trait of a radio signal" is defined as a characteristic of a radio signal that varies with:
  (i) the location of the transmitter of the signal, or
  (ii) the location of the receiver of the signal, or
  (iii) both i and ii.

For example and without limitation, the amplitude and phase of a radio signal are generally location-dependent traits of the signal. In contrast, the frequency of a radio signal is generally not a location-dependent trait of the signal.

Location-Trait Database—For the purposes of this specification, a "Location-Trait Database" is defined as a mapping that associates:
  (i) one or more location-dependent traits of one or more radio signals received or transmitted by a wireless terminal, or
  (ii) the identity of one or more radio signals received or transmitted by a wireless terminal, or
  (iii) both i and ii, at each of a plurality of locations.

Processor—For the purposes of this specification, a "processor" is defined as hardware or hardware and software that performs mathematical and/or logical operations.

Radio—For the purposes of this specification, a "radio" is defined as hardware or hardware and software that is capable of telecommunications via an unguided (i.e., wireless) radio signal of frequency less than 600 GHz.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless terminal—For the purposes of this specification, the term "wireless terminal" is defined as a device that is capable of telecommunications without a wire or tangible medium. A wireless terminal can be mobile or immobile. A wireless terminal can transmit or receive or transmit and receive. As is well known to those skilled in the art, a wireless terminal is also commonly called a cell phone, a pager, a wireless transmit/receive unit (WTRU), a user equipment (UE), a mobile station, a fixed or mobile subscriber unit, a pager, a cellular telephone, a personal digital assistant (PDA), a computer, and any other type of device capable of operating in a wireless environment are examples of wireless terminals.

DETAILED DESCRIPTION

FIG. 1 depicts a diagram of the salient components of wireless telecommunications system 100 in accordance with the illustrative embodiment of the present invention. Wireless telecommunications system 100 comprises: wireless terminal 101, cellular base stations 102-1, 102-2, and 102-3, Wi-Fi base stations 103-1 and 103-2, wireless infrastructure 111, location-based application server 112, location engine 113, weather station 114, and GPS constellation 121, interrelated as shown.

Wireless infrastructure 111, location-based application server 112, location engine 113, weather station 114, and Wi-Fi base stations 103-1 and 103-2 are all connected to one or more interconnected computer networks (e.g., the Internet, a local-area network, a wide-area network, etc.) and, as such, can exchange data in well-known fashion.

Although the illustrative embodiment depicts wireless telecommunications system 100 as comprising only one wireless terminal, it will be clear to those skilled in the art, after reading this disclosure, how to make and use alternative embodiments of the present invention that comprise any number of wireless terminals.

Wireless terminal 101 comprises the hardware and software necessary to perform the processes described below and in the accompanying figures. Furthermore, wireless terminal 101 is mobile and can be at any location within geographic region 120 at any time.

Wireless terminal 101 is capable of providing bi-directional voice, data, and video telecommunications service to a user (not shown), but it will be clear to those skilled in the art, after reading this disclosure, how to make and use embodiments of the present invention in which wireless terminal 101 provides a different set of services.

In accordance with the illustrative embodiment, wireless terminal 101 is capable of receiving one or more radio signals from each of base stations 102-1, 102-2, and 102-3, Wi-Fi base stations 103-1 and 103-2, and GPS constellation 121, in well-known fashion. Wireless terminal 101 is also capable of identifying each radio signal it receives, in well-known fashion, and of transmitting the identity of each signal it receives to location engine-113. Wireless terminal 101 is further capable of measuring one or more location-dependent traits of each radio signal it receives, in well-known fashion, and of transmitting each measurement it generates to location engine 113. And still furthermore, wireless terminal 101 is capable of measuring a difference of a location-dependent trait of two signals it receives, in well-known fashion, and of transmitting such measurements to location engine 113.

In accordance with the illustrative embodiment, wireless terminal 101 is capable of transmitting one or more radio signals—that can be received by one or more of base stations 102-1, 102-2, and 102-3 and Wi-Fi base stations 103-1 and 103-2—in accordance with specific parameters (e.g., signal strength, frequency, coding, modulation, etc.), in well-known fashion, and of transmitting those parameters to location engine 113.

In accordance with the illustrative embodiment, and as described in detail below, wireless terminal 101 comprises a barometer 205 (shown in FIG. 2) and thermometer 206 (also shown in FIG. 2). Wireless terminal 101 is capable of measuring (periodically, sporadically, and on-demand) the atmospheric pressure and temperature, in well-known fashion, and of transmitting the measurements to location engine 113.

Cellular base stations 102-1, 102-2, and 102-3 communicate with wireless infrastructure 111 via wireline and with wireless terminal 101 via radio in well-known fashion. As is well known to those skilled in the art, base stations are also commonly referred to by a variety of alternative names such as access points, nodes, network interfaces, etc. Although the illustrative embodiment comprises three base stations, it will be clear to those skilled in the art, after reading this disclosure, how to make and use alternative embodiments of the present invention that comprise any number of base stations.

In accordance with the illustrative embodiment of the present invention, cellular base stations 102-1, 102-2, and 102-3 are terrestrial, immobile, and base station 102-3 is within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 102-1, 102-2, and 102-3 comprise the hardware and software necessary to be 3GPP-compliant and to perform the processes described below and in the accompanying figures. For example and without limitation, each of cellular base stations 102-1, 102-2, and 102-3 are capable of continually:

a. receiving one or more radio signals transmitted by wireless terminal 101, and
   b. identifying each radio signal transmitted by wireless terminal 101, in well-known fashion, and of transmitting the identity of those signals to location engine 113, and
   c. measuring one or more location-dependent traits of each radio signal transmitted by wireless terminal 101, in well-known fashion, and of transmitting the measurements to location engine 113, and
   d. transmitting one or more signals to wireless terminal 101 in accordance with specific parameters (e.g., signal strength, frequency, coding, modulation, etc.), in well-known fashion, and of transmitting those parameters to location engine 113.

It will be clear to those skilled in the art how to make and use cellular base stations 102-1, 102-2, and 102-3.

Wi-Fi base stations 103-1 and 103-2 communicate with wireless terminal 101 via radio in well-known fashion. Wi-Fi base stations 103-1 and 103-2 are terrestrial, immobile, and within geographic region 120. Although the illustrative embodiment comprises two Wi-Fi base stations, it will be clear to those skilled in the art, after reading this disclosure, how to make and use alternative embodiments of the present invention that comprise any number of Wi-Fi base stations.

Each of Wi-Fi base stations 103-1 and 103-2 are capable of continually:

a. receiving one or more radio signals transmitted by wireless terminal 101, and
   b. identifying each radio signal transmitted by wireless terminal 101, in well-known fashion, and of transmitting the identity of those signals to location engine 113, and
   c. measuring one or more location-dependent traits of each radio signal transmitted by wireless terminal 101, in well-known fashion, and of transmitting the measurements to location engine 113, and
   d. transmitting one or more signals to wireless terminal 101 in accordance with specific parameters (e.g., signal strength, frequency, coding, modulation, etc.), in well-known fashion, and of transmitting those parameters to location engine 113.

It will be clear to those skilled in the art how to make and use Wi-Fi base stations 103-1 and 103-2.

Wireless infrastructure 111 comprises a switch that orchestrates the provisioning of telecommunications service to wireless terminal 101 and the flow of information to and from location engine 113, as described below and in the accompanying figures. As is well known to those skilled in the art, wireless switches are also commonly referred to by other names such as mobile switching centers, mobile telephone switching offices, routers, etc.

Location-based application server 112 comprises hardware and software that uses the estimate of the location of wireless terminal 101—generated by location engine 113—in a location-based application, in well-known fashion. Location-based applications are well-known in the art and provide services such as without limitation E-911 routing, navigation, location-based advertising, weather alerts.

Location engine 113 is a data processing system that comprises hardware and software that generates one or more estimates of the location of wireless terminal 101 as described below and in the accompanying figures. It will be clear to those skilled in the art, after reading this disclosure, how to make and use location engine 113. Furthermore, although location engine 113 is depicted in FIG. 2 as physically distinct from wireless infrastructure 111, it will be clear to those skilled in the art, after reading this disclosure, how to make and use alternative embodiments of the present invention in which location engine 113 is wholly or partially integrated into wireless infrastructure 111. Location engine 113 comprises the location-trait database and GIS databases, which are described in detail below.

Weather station 114 comprises hardware and software that continually measures the outdoor temperature and atmospheric pressure, in well-known fashion, and transmits those measurements to location engine 113. Weather station 114 is at a known location in geographic region and known elevation. Although the illustrative embodiment comprises only one weather station, it will be clear to those skilled in the art how to make and use alternative embodiments of the present invention that comprise any number of weather stations.

Figure 2:
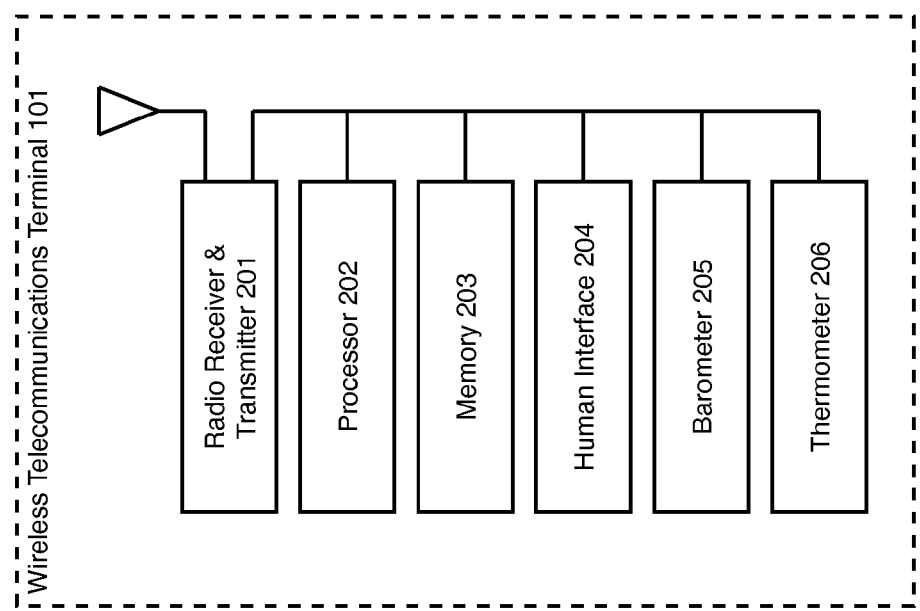
FIG. 2 depicts a block diagram of the salient components of wireless terminal 101 in accordance with the illustrative embodiment of the present invention.

FIG. 2 depicts a block diagram of the salient components of wireless terminal 101 in accordance with the illustrative embodiment of the present invention. Wireless terminal 101 comprises: radio receiver and transmitter 201, processor 202, memory 203, human interface 204, barometer 205, and thermometer 206, interconnected as shown.

Radio receiver and transmitter 201 comprises hardware and software that enables wireless terminal 101 to receive (and analyze) radio signals and to transmit radio signals. In accordance with the illustrative embodiment, wireless telecommunications service is provided to wireless terminal 101 in accordance with the air-interface standard of the $3^{rd}$ Generation Partnership Project ("3GPP"). After reading this disclosure, however, it will be clear to those skilled in the art how to make and use alternative embodiments of the present invention that operate in accordance with one or more other air-interface standards (e.g., Global System Mobile "GSM," UMTS, CDMA-2000, IS-136 TDMA, IS-95 CDMA, 3G Wideband CDMA, IEEE 802.11 Wi-Fi, 802.16 WiMax, Bluetooth, etc.) in one or more frequency bands. As will be clear to those skilled in the art, a wireless terminal is also known as a "cell phone," "mobile station," "car phone," "PDA," and the like. It will be clear to those skilled in the art how to make and use radio receiver and transmitter 201.

Processor 202 is hardware under the command of software stored in memory 203 that performs all of the functions described below and in the accompanying figures. It will be clear to those skilled in the art how to make and use processor 202.

Memory 203 is a non-volatile random-access memory that holds all of the programming and data required for the operation of wireless terminal 101. It will be clear to those skilled in the art how to make and use memory 203.

Human interface 204 is hardware and software that enables a person to interact with wireless terminal 101. Human interface 204 comprises a display, keypad, microphone, and speaker, and it will be clear to those skilled in the art how to make and use human interface 204.

Barometer 205 is a hardware MEMS sensor that measures the atmospheric pressure at wireless terminal 101. In accordance with the illustrative embodiment, barometer 205 is the LSP331AP MEMS pressure sensor from ST Microelectronics, but it will be clear those skilled in the art, after reading this disclosure, how to make and use alternative embodiments of the present invention that use a different sensor to measure the atmospheric pressure.

Thermometer 206 is a hardware temperature sensor that measures the ambient temperature at wireless terminal 101. In accordance with the illustrative embodiment, thermometer 206 is the ADT7420 temperature sensor from Analog Devices, but it will be clear to those skilled in the art, after reading this disclosure, how to make and use alternative embodiments of the present invention that use a different sensor to measure the ambient temperature at wireless terminal 101.

Radio receiver and transmitter 201 are capable of performing the processes described below and in the accompanying figures. For example and without limitation, wireless terminal 101 is capable of:

a. receiving one or more radio signals transmitted by cellular base stations 102-1, 102-2, and 102-3, Wi-Fi base stations 103-1 and 103-2, and GPS constellation 121, and b. identifying each radio signal transmitted by cellular base stations 102-1, 102-2, and 102-3, Wi-Fi base stations 103-1 and 103-2, and GPS constellation 121, in well-known fashion, and of transmitting the identity of those signals to location engine 113, and c. measuring one or more location-dependent traits of each radio signal transmitted by cellular base stations 102-1, 102-2, and 102-3, Wi-Fi base stations 103-1 and 103-2, and GPS constellation 121, in well-known fashion, and of transmitting the measurements to location engine 113, and d. transmitting one or more signals to cellular base stations 102-1, 102-2, and 102-3, Wi-Fi base stations 103-1 and 103-2 in accordance with specific parameters (e.g., signal strength, frequency, coding, modulation, etc.), in well-known fashion, and of transmitting those parameters to location engine 113, and e. measuring the temperature and atmospheric pressure at wireless terminal 101, in well-known fashion, and transmitting those measurements to location engine 113.

It will be clear to those skilled in the art how to make and use wireless terminal 101.

Location Engine 113—

Figure 3:
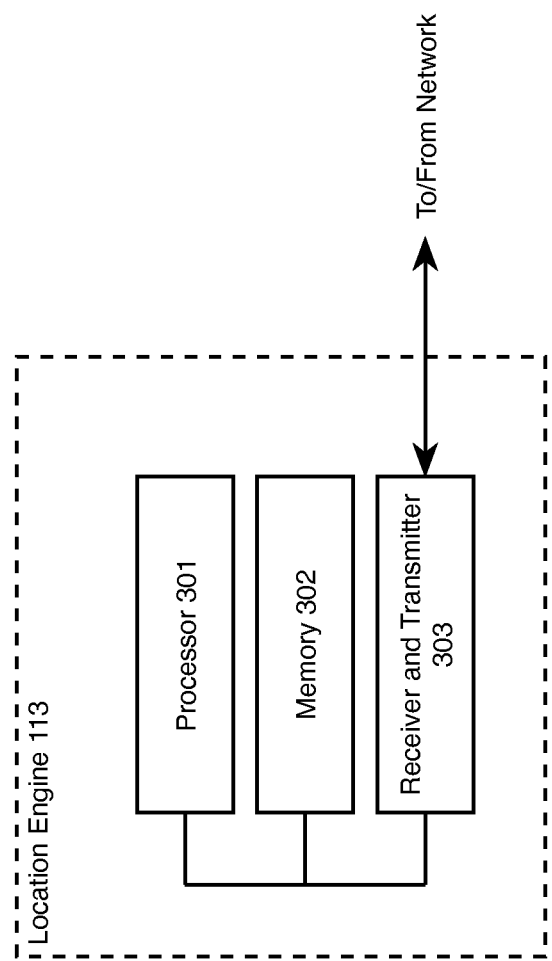
FIG. 3 depicts a block diagram of the salient components of location engine 113 in accordance with the illustrative embodiment.

FIG. 3 depicts a block diagram of the salient components of location engine 113 in accordance with the illustrative embodiment. Location engine 113 comprises: processor 301, memory 302, and receiver and transmitter 303, which are interconnected as shown.

Processor 301 is a general-purpose processor that is capable of executing an operating system, the application software that performs tasks 402 through 406 (described herein and shown in FIG. 4), and of populating, amending, using, and managing a location-trait database and a GIS database, as described in detail below and in the accompanying figures. It will be clear to those skilled in the art how to make and use processor 301.

In general, the location-trait database contains information for the possible locations of wireless terminal and the identity and location-dependent traits of radio signals as if wireless terminal 101 were at each of those locations. It will be clear to those skilled in the art how to make and use the location-trait database.

In general, the GIS database contains information for geographic region 120, including without limitation, the physical characteristics of all of the structures in geographic region 120. It will be clear to those skilled in the art how to make and use the GIS database.

Memory 302 is a non-volatile memory that stores:
 a. the operating system, and
 b. the application software, and
 c. the location-trait database, and
 d. the GIS database.

It will be clear to those skilled in the art how to make and use memory 302.

Receiver and transmitter 303 enables location engine 113 to transmit to and receive from wireless terminal 101, wireless infrastructure 111, location-based application server 112, weather station 114, and Wi-Fi base stations 103-1 and 103-2, in well-known fashion. It will be clear to those skilled in the art how to make and use receiver and transmitter 303.

Operation of the Illustrative Embodiment—

Figure 4:
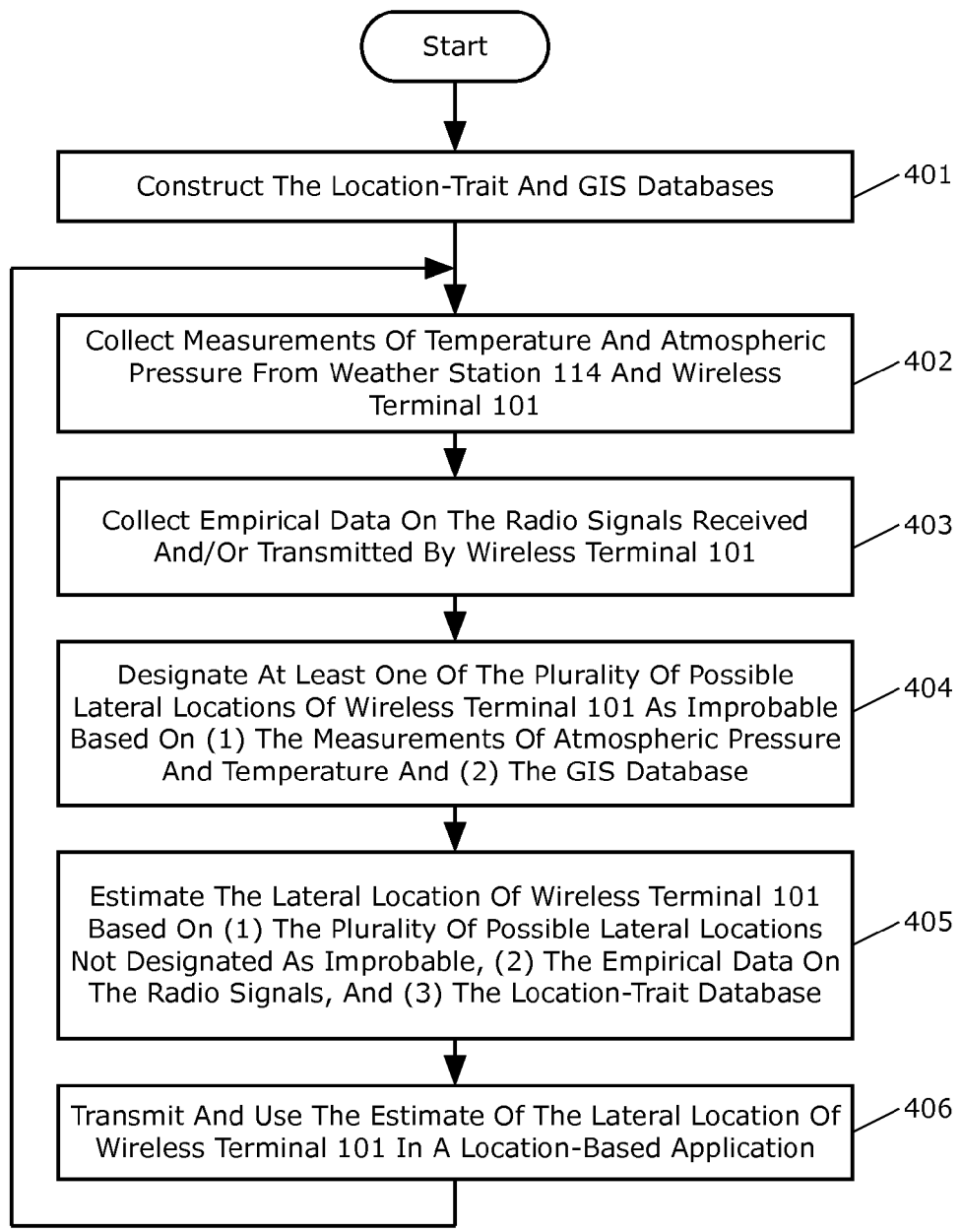
FIG. 4 depicts a flowchart of the salient processes performed in accordance with the illustrative embodiment of the present invention.

FIG. 4 depicts a flowchart of the salient processes performed in accordance with the illustrative embodiment of the present invention.

At task 401, the location-trait database and the GIS database are constructed and stored in memory 302 of location engine 113. Task 401 is described in detail below and in the accompanying figures.

At task 402, location engine 113 collects measurements of temperature and atmospheric pressure from weather station 114 and wireless terminal 101. Task 402 is described in detail below and in the accompanying figures.

At task 403, location engine 113 collects empirical data on the radio signals received and transmitted by wireless terminal 101. Task 403 is described in detail below and in the accompanying figures.

At task 404, location engine 113 designates at least one of a plurality of possible lateral locations of wireless terminal 101 as improbable based on:
 (i) the measurements of temperature and atmospheric pressure received in task 402, and
 (ii) the information in the GIS database.
Task 404 is described in detail below and in the accompanying figures.

At task 405, location engine 113 generates an estimate of the lateral location of wireless terminal 101 based on:
 (i) the plurality of possible lateral locations not designated as improbable in task 404,
 (ii) the empirical data on radio signals received in task 403, and
 (iii) the information in the location-trait database.

It will be clear to those skilled in the art how to enable embodiments of the present invention to perform task 405. See for example and without limitation, U.S. Pat. Nos. 6,944,465, 7,460,505, 7,383,051, 7,257,414, 7,753,278, 7,433,695, 7,848,762, and 8,630,665, each of which are incorporated by reference.

At task 406, location engine 113 transmits:
 (i) the estimate of the lateral location of wireless terminal 101 generated in task 405, and
 (ii) the estimate of the elevation of wireless terminal 101 generated in task 404
to location-based application server 112 and to wireless terminal 101 for use in a location-based application. It will be clear to those skilled in the art how to enable embodiments of the present invention to perform task 406. After task 406 is completed, control passes back to task 402.

Task 401: Construct the GIS Database and the Location-Trait Database—

Figure 5:
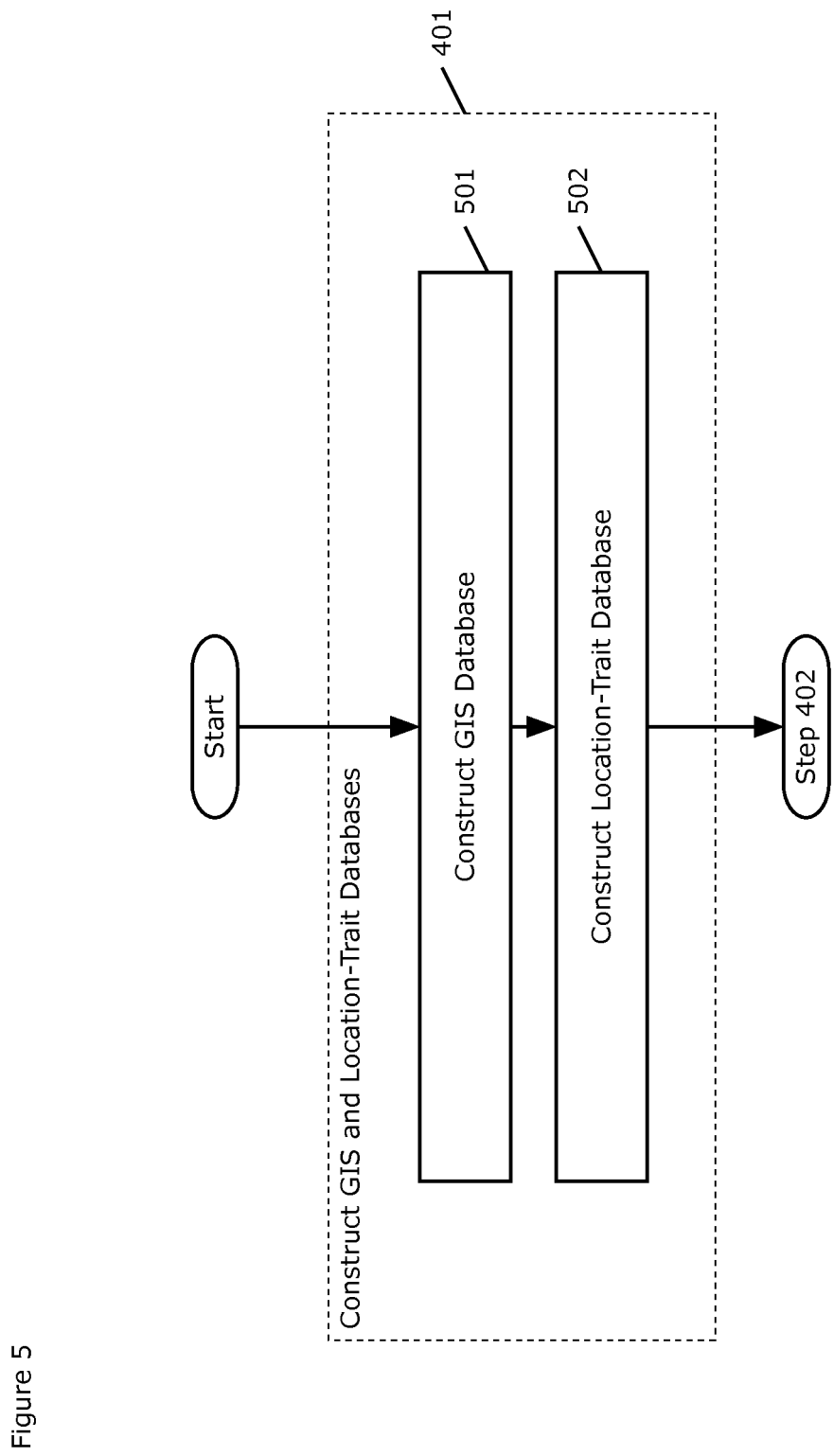
FIG. 5 depicts a flowchart of the salient processes performed in accordance with task 401.

FIG. 5 depicts a flowchart of the salient processes performed in accordance with task 401.

At task 501, the GIS database is constructed and stored in memory 302 of location engine 113.

Figure 6:
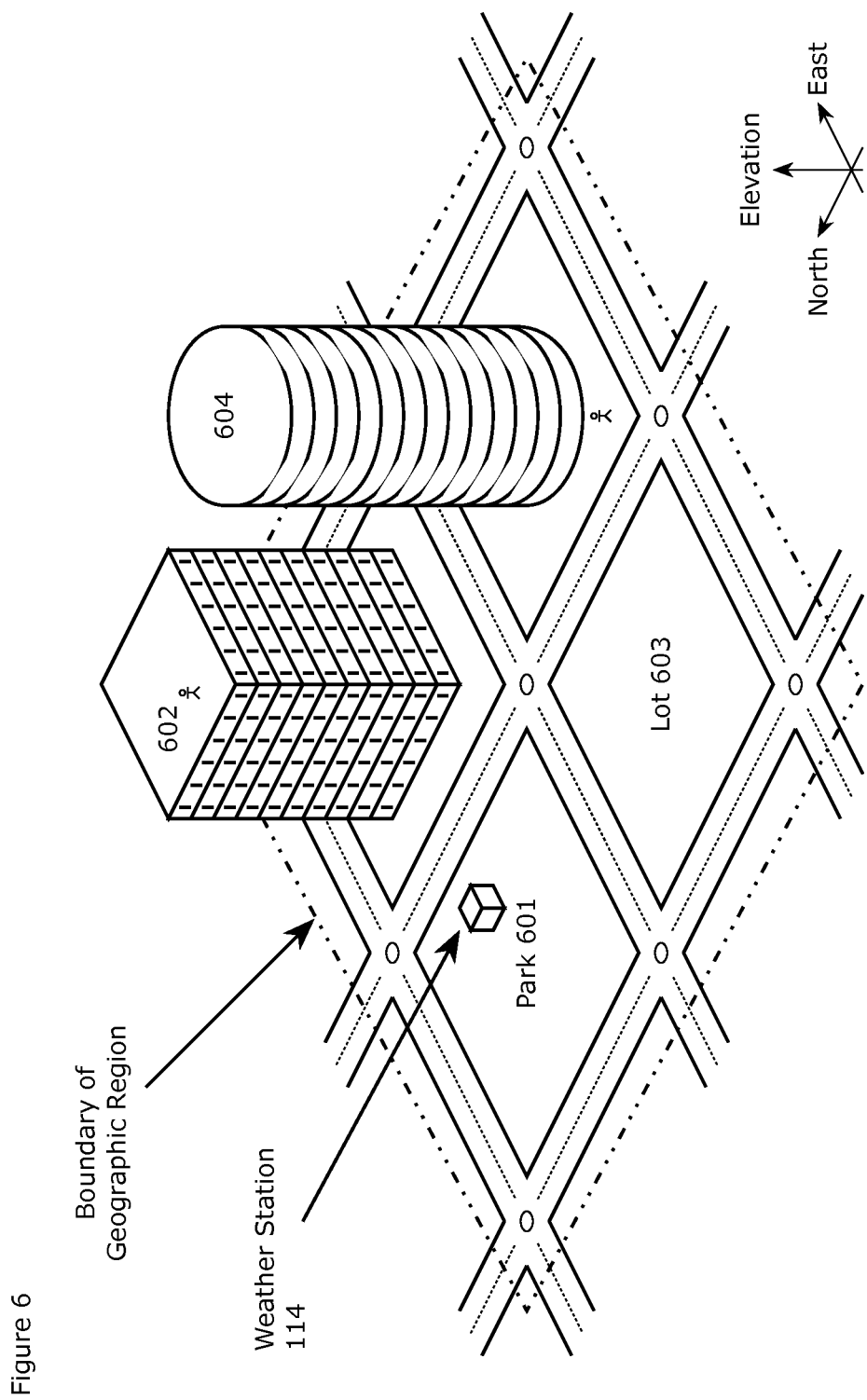
FIG. 6 depicts an isometric drawing of geographic region 120 in accordance with the illustrative embodiment of the present invention.

As part of task 501, geographic region 120 is delimited and surveyed in three dimensions. FIG. 6 depicts an isometric drawing of geographic region 120, which spans approximately four city blocks and comprises, among other things, park 601, boxy building 602, empty lot 603, and cylindrical building 604. It will be clear to those skilled in the art, after reading this disclosure, how to make and use alternative embodiments of the present invention that comprise any area, any geographic features, and any number, size, height, and shape of structures.

In accordance with the illustrative embodiment, geographic region 120 is flat, level, and at an elevation of 1000 meters. It will be clear to those skilled in the art, however, after reading this disclosure, how to make and use alternative embodiments of the present invention in which geographic region is not flat, not level, and/or is at a different elevation.

In accordance with the illustrative embodiment, the height of boxy building 602 is 128 meters and the height of cylindrical building 604 is 140 meters. In other words, the elevation of boxy building 602 is 1128 meters and the elevation of cylindrical building 604 is 1140 meters. It will be clear to those skilled in the art, after reading this disclosure, how to make and use alternative embodiments of the present invention in which the structures have any height.

Figure 7:
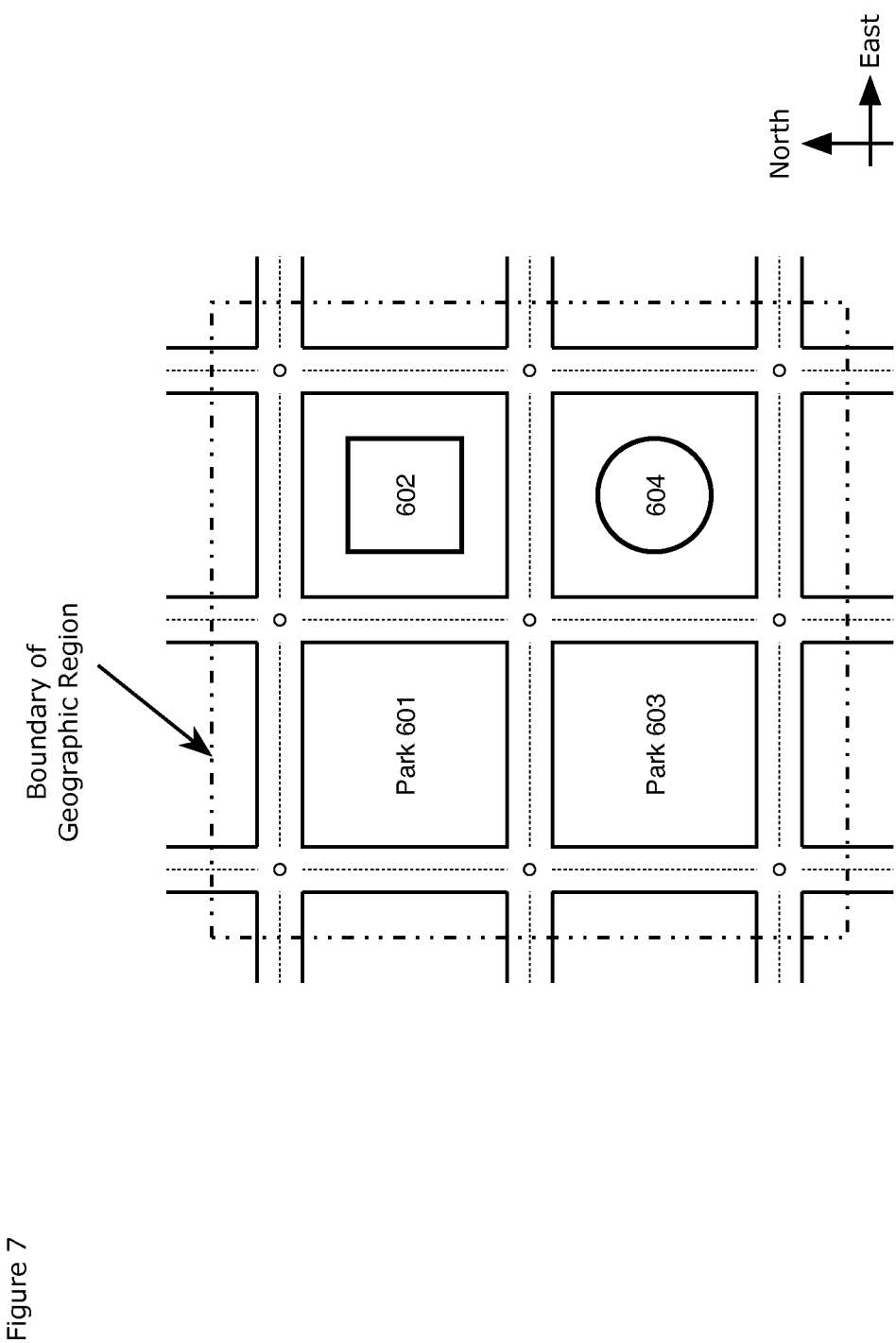
FIG. 7 a detailed map of the ground level of geographic region 120.

In accordance with the illustrative embodiment, geographic region 120 is square and comprises approximately four city blocks of an urban environment. It will be clear to those skilled in the art however, after reading this disclosure, how to make and use alternative embodiments of the present invention in which geographic region 120 has any area of any shape and any population density and development. As part of task 501, a detailed map of the ground level of geographic region is made in well-known fashion, and as shown in FIG. 7.

Figure 8:
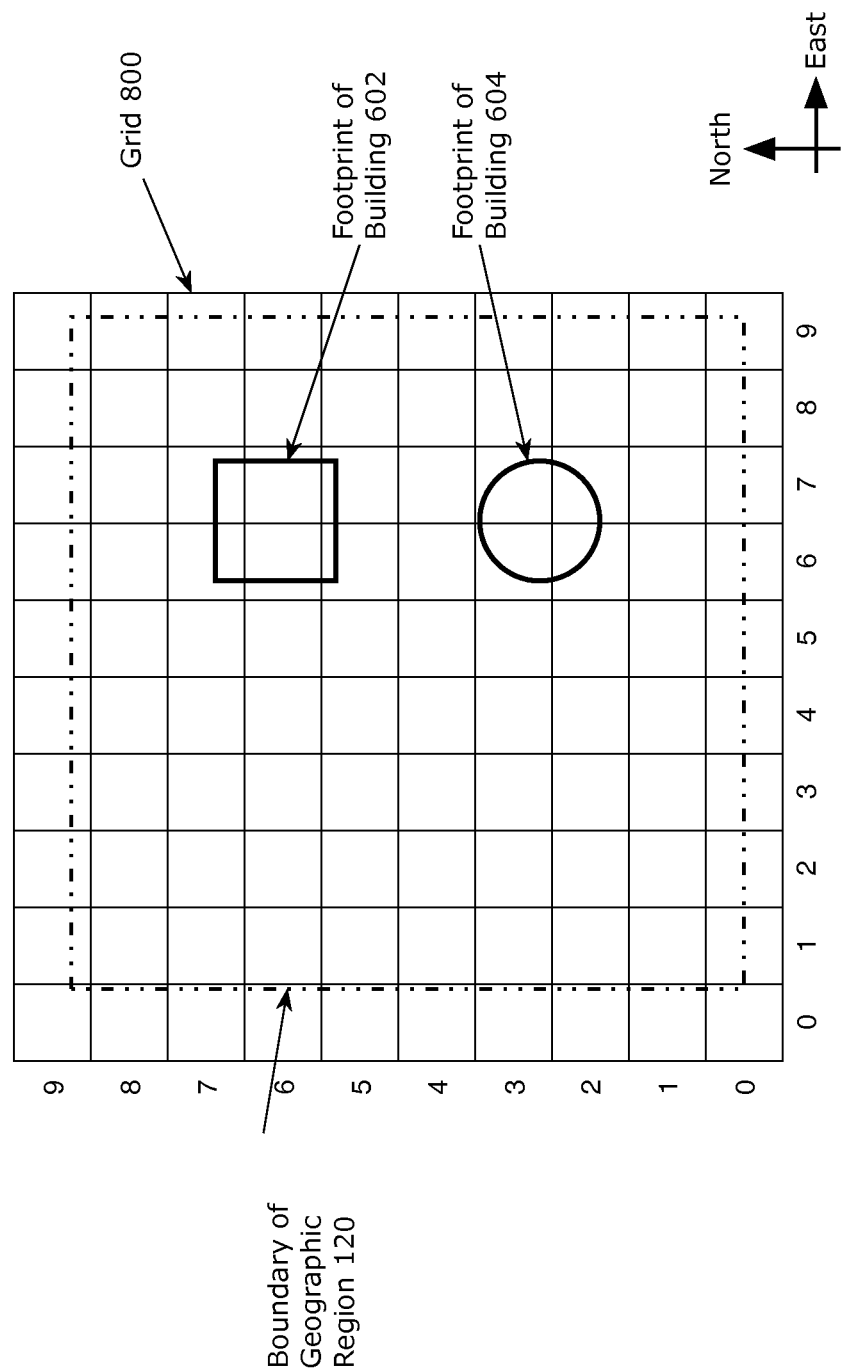
FIG. 8 depicts geographic region 120 divided into a 10 by 10 grid.

As part of task 501, grid 800 is overlaid onto geographic region 120 as shown in FIG. 8. Grid 800 is an 10 by 10 grid that partitions geographic region 120 into a plurality of possible lateral locations of wireless terminal 101. FIG. 8 also depicts the relationship of the footprints of boxy building 602 and cylindrical building 604 with respect to the grid.

Although the illustrative embodiment comprises 100 grid squares, it will be clear to those skilled in the art how to make and use alternative embodiments of the present invention that comprise any number of possible lateral locations with any shape. See for example and without limitation, U.S. Pat. No. 7,753,278, which is incorporated by reference.

At any instant, the three-dimensional location of wireless terminal 101 can be described by a combination of a lateral location and an elevation. Although it is not improbable for wireless terminal 101 to be at any lateral location in geographic region 120 and it is not improbable for wireless terminal 101 to be at any elevation (up to 140 meters) above geographic region 120, it is improbable for wireless terminal 101 to be at some combinations of those lateral locations and elevations. For example, it is not improbable for wireless terminal 101 to be at a lateral location in park 601 and to have an elevation of 1001 meters (i.e., be at or near ground level). It is, however, improbable for wireless terminal 101 to be at a lateral location in park 601 and to have an elevation of 1060 meters.

Therefore, as part of task 501, each improbable combination of lateral locations and elevations for wireless terminal 101 in geographic region is determined, indexed by elevation, and stored in the GIS database. Each improbable combination of lateral locations and elevation for wireless terminal 101 can be determined by referencing the three-dimensional survey of geographic region 120, which is depicted in FIG. 9.

Figure 9:
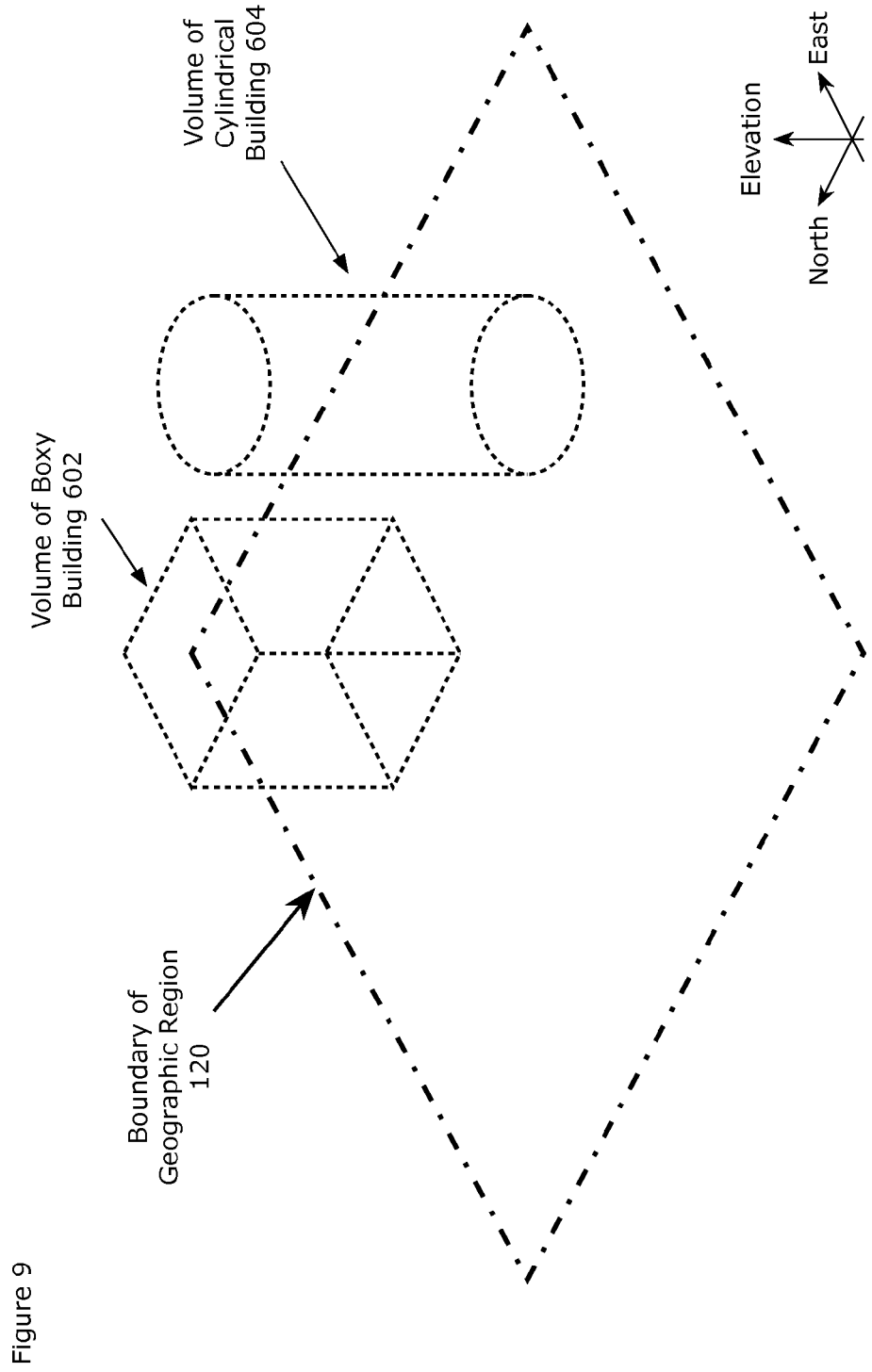
FIG. 9 depicts a map that depicts where in geographic region 120 it is not improbable for wireless terminal 101 to be located.

From the survey (as depicted in FIGS. 8 and 9), it can be easily seen that when wireless terminal 101 is at ground level (e.g., under an elevation of 1003 meters, etc.), it is not improbable for wireless terminal 101 to be at any lateral location in geographic region 120.

In contrast, when wireless terminal 101 is at an elevation above ground level (e.g., above an elevation of 1003 meters, etc.) and below the rooftop of building 602 (1128 meters), it is improbable for wireless terminal 101 to be at any lateral location that is outside of either boxy building 602 or cylindrical building 604. Therefore, when wireless terminal 101 is in this range of elevations, the plurality of lateral locations of wireless terminal 101 that are not improbable include: (6,2), (6,3), (6,5), (6,6), (6,7), (7,2), (7,3), (7,5), (7,6), and (7,7).

When wireless terminal 101 is at an elevation above the rooftop of building 602 (1128 meters) and below the rooftop of building 604 (1140 meters), it is improbable for wireless terminal 101 to be at any lateral location that is outside of cylindrical building 604. Therefore, when wireless terminal 101 is in this range of elevations, the plurality of lateral locations of wireless terminal 101 that are not improbable include: (6,5), (6,6), (6,7), (7,5), (7,6), and (7,7).

This information is stored in the GIS database in memory 302 as shown in Table 1.

TABLE 1

Possible Lateral Locations of Wireless Terminal 101 That Are Not Improbable Given The Elevation of Wireless Terminal 101

| Elevation of Wireless Terminal 101 | Possible Lateral Locations of Wireless Terminal 101 That Are Not Improbable |
|---|---|
| 1000 to 1003 meters | All 100 Grid Squares |
| 1003 to 1128 meters | (6, 2), (6, 3), (6, 5), (6, 6), (6, 7), (7, 2), (7, 3), (7, 5), (7, 6), (7, 7) |
| 1028 to 1140 meters | (6, 5), (6, 6), (6, 7), (7, 5), (7, 6), (7, 7) |

At task 502, the location-trait database is constructed and stored into memory 302 of location engine 113. As part of task 503, the identity—and location-dependent traits for—each radio signal that wireless terminal is expected to be able to receive from cellular base stations 102-1, 102-2, and 102-3, Wi-Fi base stations 103-1 and 103-2, for each possible lateral location of wireless terminal 101, is determined in well-known fashion.

As part of task 502, the identity of—and location-dependent traits for—each radio signal that each of cellular base stations 102-1, 102-2, and 102-3, Wi-Fi base stations 103-1 and 103-2 is expected to be able to receive from wireless terminal 101, for each possible lateral location of wireless terminal 101, is determined in well-known fashion.

It will be clear to those skilled in the art how to accomplish task 503, and in accordance with the illustrative embodiment, this is accomplished through a combination of "drive testing" (i.e., empirical data gathering) and radio-frequency propagation modeling. See for example and without limitation, U.S. Patent Application Publications 2008/0077356, 2008/0077472, and 2008/0077516, which are incorporated by reference.

Task 402: Collect Temperature and Atmospheric Measurements—

Figure 10:
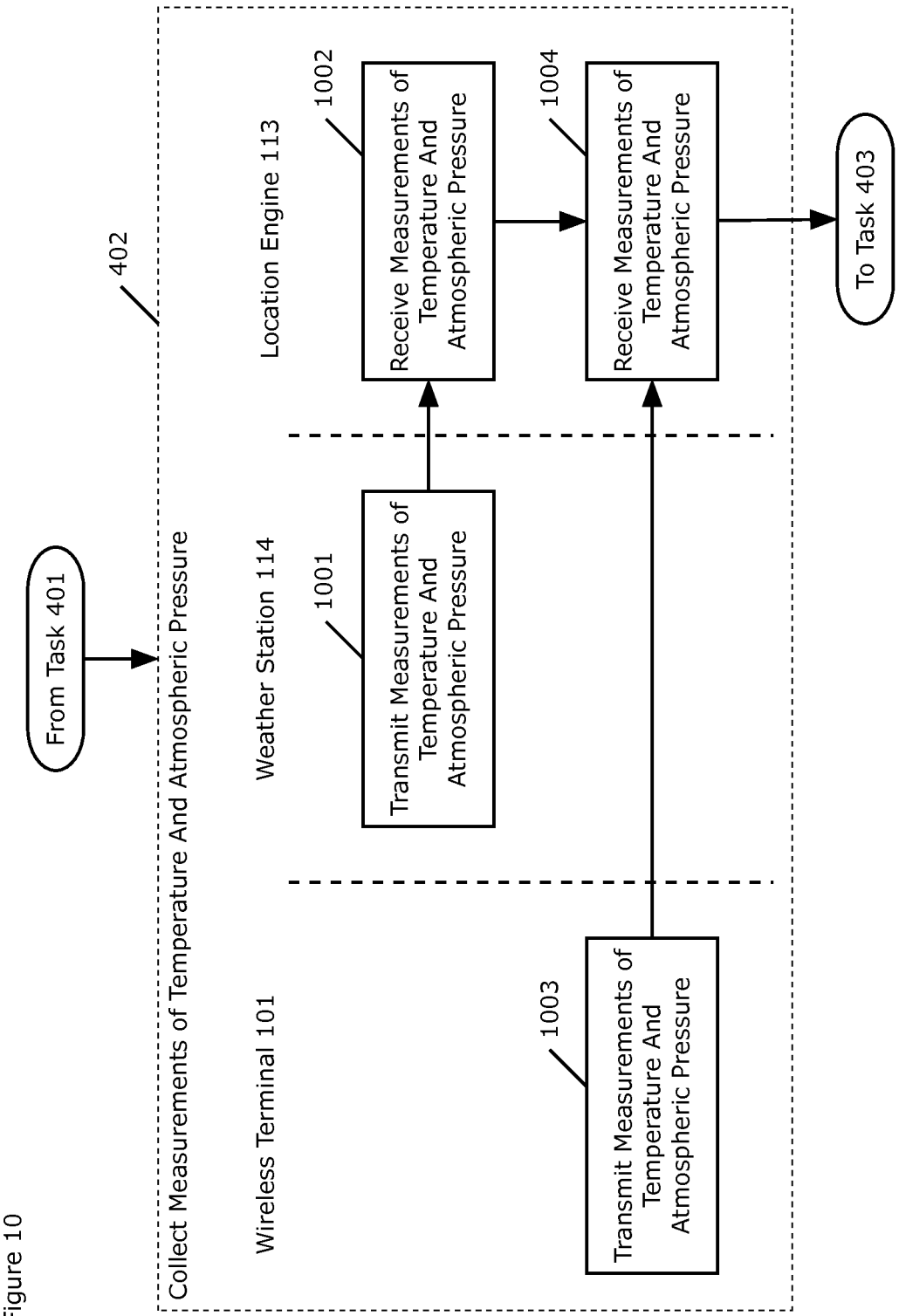
FIG. 10 depicts a flowchart of the salient processes performed in accordance with task 402.

FIG. 10 depicts a flowchart of the salient processes performed in accordance with task 402.

At task 1001, weather station 114 transmits a measurement of temperature, $T_W$, and a measurement of atmospheric pressure, $P_W$, to location engine 113. In accordance with the illustrative embodiment, task 1001 is performed every 10 minutes, but it will be clear to those skilled in the art how to make and use alternative embodiments of the present invention that transmit the measurements at other times.

At task 1002, location engine 113 receives the measurement of temperature, $T_W$, and a measurement of atmospheric pressure, $P_W$, transmitted in task 1101.

At task 1003, wireless terminal 101 transmits a measurement of temperature, $T_T$, and a measurement of atmospheric pressure, $P_T$, to location engine 113. In accordance with the illustrative embodiment, task 1003 is performed every 5 seconds, but it will be clear to those skilled in the art how to make and use alternative embodiments of the present invention that transmit the measurements at other times.

At task 1004, location engine 113 receives the temperature and atmospheric measurements transmitted in task 1103.

In accordance with the illustrative embodiment, tasks 1001, 1002, 1003, and 1004 are performed continuously, concurrently, and asynchronously.

Task 403: Collect Empirical Data on Radio Signals—

Figure 11:
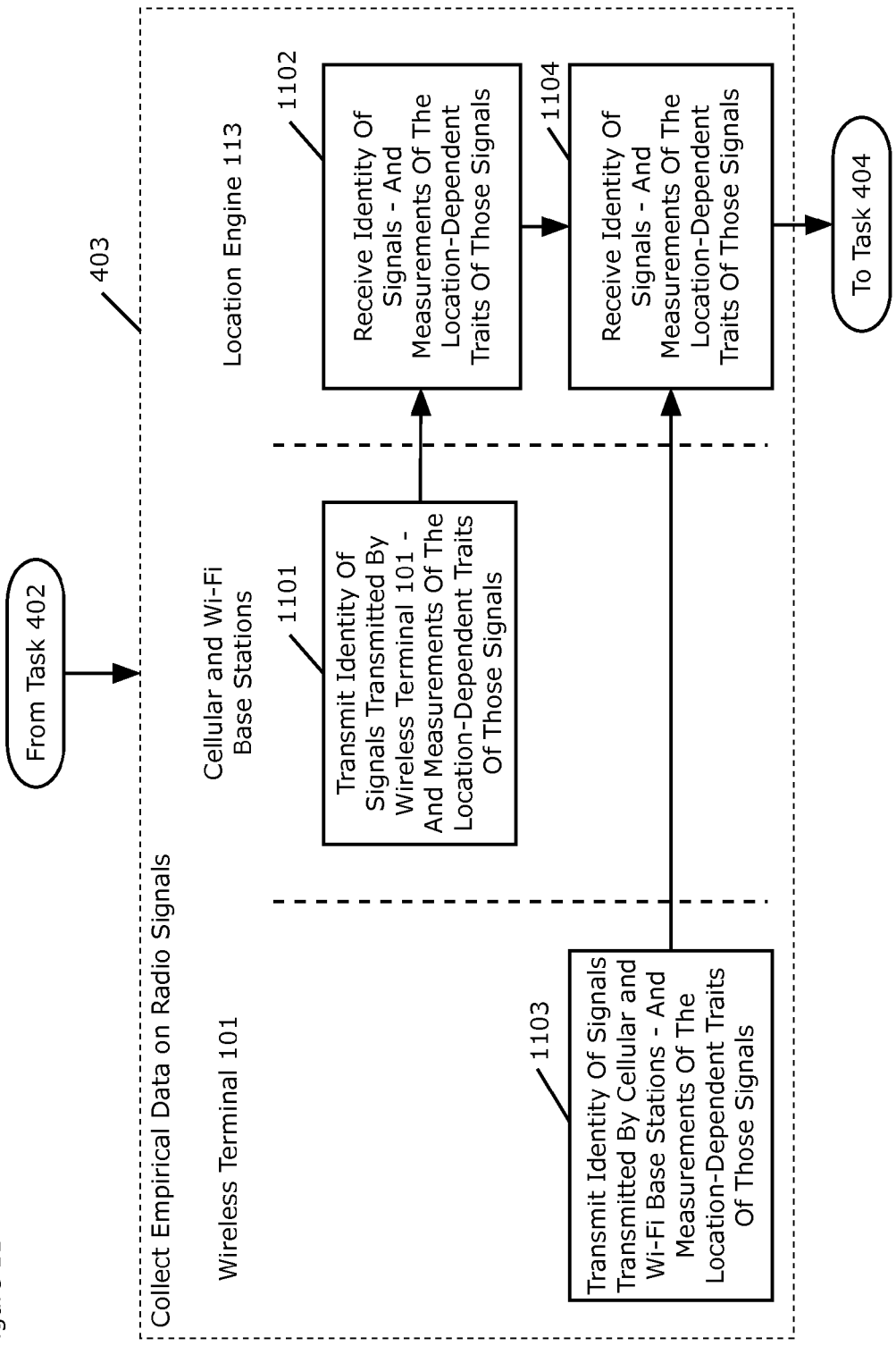
FIG. 11 depicts a flowchart of the salient processes performed in accordance with task 403.

FIG. 11 depicts a flowchart of the salient processes performed in accordance with task 403.

At task 1101, each of cellular base stations 102-1, 102-2, and 102-3 and Wi-Fi base stations 103-1 and 103-2 transmits the identity of each signal it has received from wireless terminal 101 and the measurements of the location-dependent traits of those signals. In accordance with the illustrative embodiment, task 1101 is performed every 20 milliseconds, but it will be clear to those skilled in the art how to make and use alternative embodiments of the present invention that transmit the measurements at other times.

At task 1102, location engine receives the identities and measurements transmitted at task 1101.

At task 1103, wireless terminal 101 transmits the identity of each signal it receives from cellular base stations 102-1, 102-2, and 102-3 and Wi-Fi base stations 103-1 and 103-2 and the measurements of the location-dependent traits of those signals. In accordance with the illustrative embodiment, task 1103 is performed every 20 milliseconds, but it will be clear to those skilled in the art how to make and use alternative embodiments of the present invention that transmit the measurements at other times.

At task 1104, location engine receives the identities and measurements transmitted at task 1103.

In accordance with the illustrative embodiment, tasks 1101, 1102, 1103, and 1104 are performed continuously, concurrently, and asynchronously.

Task 404: Designate at Least One of the Plurality of Possible Lateral Locations of Wireless Terminal as Improbable Based on the Measurements of Temperature and Atmospheric Pressure—

Figure 12:
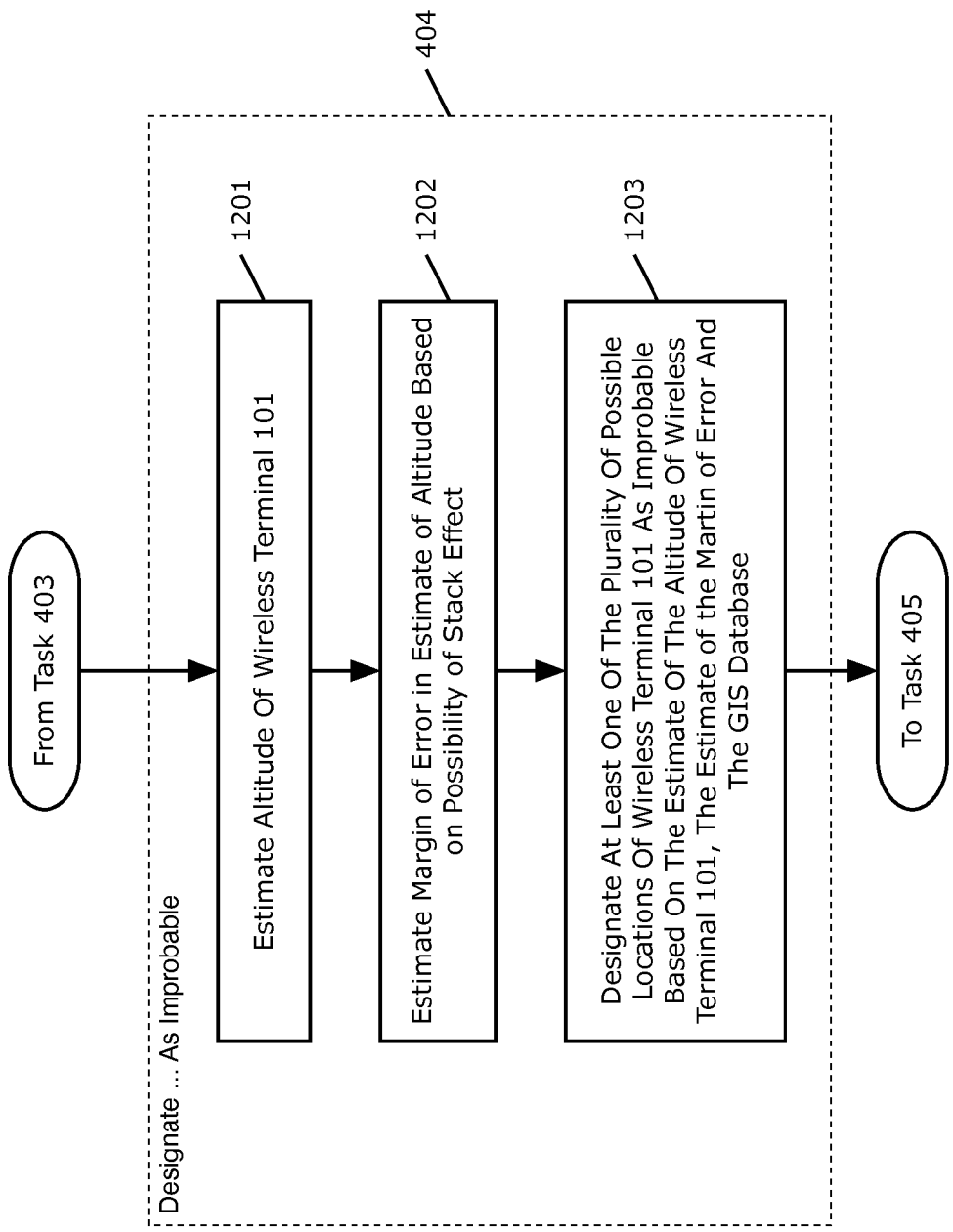
FIG. 12 depicts a flowchart of the salient processes performed in accordance with task 404.

FIG. 12 depicts a flowchart of the salient processes performed in accordance with task 404.

At task 1201, location engine 113 generates an estimate of the reference atmospheric pressure for geographic location 120, $P_0$, based on:

$$P_0 = \frac{P_W}{e^{-\left(\frac{Z_W}{H}\right)}} \qquad (Eq.\ 1)$$

wherein:
$P_0$ is the reference atmospheric pressure for geographic location 120,
$P_W$ is the Measurement of Atmospheric Pressure Received from weather station 114 that most closely corresponds in time to the measurement of atmospheric pressure of interest received from wireless terminal 101, $P_T$,
$Z_W$ is the elevation of weather station 114 (1000 meters in the illustrative embodiment), and
H is the scale height of the atmosphere, which is the elevation at which the atmospheric pressure has decreased to $e^{-1}$ times its value at mean sea level (e.g., approximately 7000 meters).

At task 1202, location engine 113 generates an estimate of the elevation of wireless terminal 101, $Z_T$, based on:

$$Z_T = -H\ln\left(\frac{P_T}{P_0}\right) \qquad (Eq.\ 2)$$

wherein:
$P_T$ is the relevant measurement of atmospheric pressure received from wireless terminal 101.

At task 1203, location engine 113 generates an estimate of the margin of error in the estimate of elevation, $Z_T$, which—if wireless terminal 101 is inside of a building—might be caused by the stack effect. The margin of error, E, is based on:

$$E = \left|-H\ln\left(\frac{P_T - P_M}{P_0}\right) - Z_T\right| \qquad (Eq.\ 3)$$

wherein:
$P_M$ is the maximum pressure differential that might be caused by the stack effect if wireless terminal 101 is inside of a building, which is found by:

$$P_M = CBP_W\left(\frac{1}{T_W} - \frac{1}{T_T}\right) \qquad (Eq.\ 4)$$

wherein:
C is a constant equal to 0.0342 (for SI units) and 0.0188 (for U.S. units),
B is the height of the tallest structure in geographic region 120,
$P_W$ is the measurement of atmospheric pressure at weather station 114,
$T_W$ is the measurement of temperature at weather station 114, and
$T_T$ is the measurement of temperature at wireless terminal 101.

Considering the maximum possible error caused by the stack effect, the range of possible elevations for wireless terminal 101 is any elevation $Z_T$-E between $Z_T$+E, exclusively.

At task 1203, location engine 113 designates at least one of a plurality of possible lateral locations of wireless terminal 101 as improbable based on the estimate of the elevation of wireless terminal 101. This is accomplished by designating all of the possible lateral locations of wireless terminal 101 as improbable except for those corresponding in Table 1 to any elevation $Z_T$-E between $Z_T$+E, exclusively.

Figure 13:
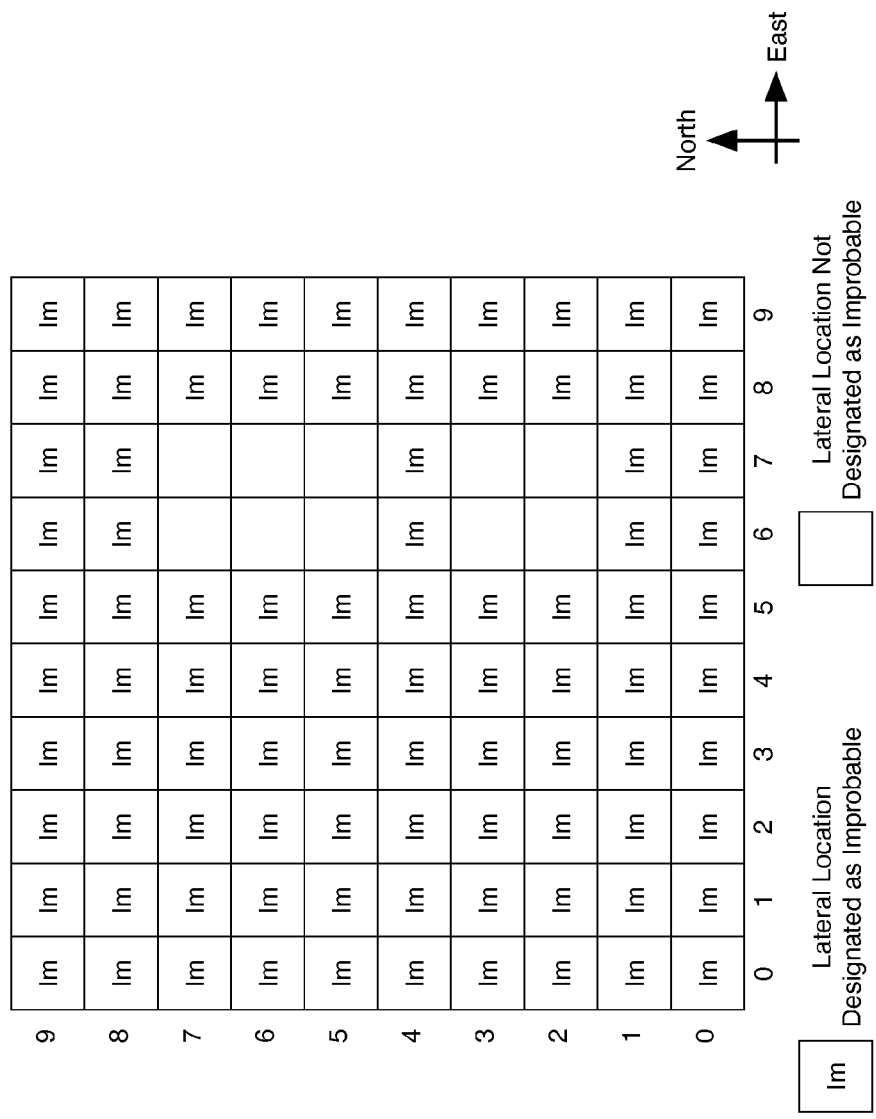
FIG. 13 depicts an illustrative map of the lateral locations in geographic region 120 that are designated as improbable and those that are not.

For example, if the value of $Z_t$ is 1127 meters and E=4 meters then $Z_T$-E=1124 meters and $Z_T$+E=1131 meters. All 100 grid squares in grid 800 are designated as improbable except for the ten grid squares corresponding to 1124 meters—(6,2), (6,3), (6,5), (6,6), (6,7), (7,2), (7,3), (7,5), (7,6), and (7,7)—or the six grid squares corresponding to 1131 meters—(6,5), (6,6), (6,7), (7,5), (7,6), and (7,7) or both. In this case, other 90 grid squares are designated as improbable, as shown in FIG. 13.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of estimating the lateral location of a wireless terminal, the method comprising:
   receiving, at a data processing system, the identity of a radio signal that is received by a wireless terminal;
   receiving, at the data processing system, a measurement of atmospheric pressure at the wireless terminal;
   designating at least one of a plurality of possible lateral locations of the wireless terminal as improbable based on:
      (i) the measurement of atmospheric pressure at the wireless terminal; and
   estimating the lateral location of the wireless terminal to be one of the plurality of possible lateral locations of the wireless terminal not designated as improbable based on:
      (i) the identity of the radio signal.

2. The method of claim 1 further comprising:
   receiving, at the data processing system, a measurement of a location-dependent trait of a radio signal as received by the wireless terminal; and
   wherein estimating the lateral location of the wireless terminal to be one of the plurality of possible lateral locations of the wireless terminal not designated as improbable is also based on:
      (ii) the measurement of the location-dependent trait of the radio signal.

3. The method of claim 1 further comprising:
receiving, at the data processing system, a measurement of atmospheric pressure at a location that is outdoors; and
wherein designating at least one of the plurality of possible lateral locations of the wireless terminal as improbable is also based on:
(ii) the measurement of atmospheric pressure at the location that is outdoors.

4. The method of claim 1 further comprising:
receiving, at the data processing system, a measurement of temperature at the wireless terminal; and
wherein designating at least one of the plurality of possible lateral locations of the wireless terminal as improbable is also based on:
(ii) the measurement of temperature at the wireless terminal.

5. The method of claim 4 further comprising:
receiving, at the data processing system, a measurement of temperature at a location that is outdoors; and
wherein designating at least one of the plurality of possible lateral locations of the wireless terminal as improbable is also based on:
(iii) the measurement of temperature at the location that is outdoors.

6. The method of claim 1 wherein all of the plurality of possible lateral locations of the wireless terminal not designated as improbable are indoors.

7. A method of estimating the lateral location of a wireless terminal, the method comprising:
receiving, at a data processing system, a measurement of a location-dependent trait of a radio signal as received by a wireless terminal;
receiving, at the data processing system, a measurement of atmospheric pressure at the wireless terminal;
designating at least one of a plurality of possible lateral locations of the wireless terminal as improbable based on:
(i) the measurement of atmospheric pressure at the wireless terminal; and
estimating the lateral location of the wireless terminal to be one of the plurality of possible lateral locations of the wireless terminal not designated as improbable based on:
(i) the measurement of the location-dependent trait of the radio signal.

8. The method of claim 7 wherein the step of estimating the lateral location of the wireless terminal comprises:
comparing the measurement of the location-dependent trait of the radio signal to:
(a) a first expected value of the location-dependent trait of the radio signal at a first lateral location, and
(b) a second expected value of the location-dependent trait of the radio signal at a second lateral location.

9. The method of claim 7 further comprising:
receiving, at the data processing system, a measurement of atmospheric pressure at a location that is outdoors; and
wherein designating at least one of the plurality of possible lateral locations of the wireless terminal as improbable is also based on:
(ii) the measurement of atmospheric pressure at the location that is outdoors.

10. The method of claim 7 further comprising:
receiving, at the data processing system, a measurement of temperature at the wireless terminal; and
wherein designating at least one of the plurality of possible lateral locations of the wireless terminal as improbable is also based on:
(ii) the measurement of temperature at the wireless terminal.

11. The method of claim 10 further comprising:
receiving, at the data processing system, a measurement of temperature at a location that is outdoors; and
wherein designating at least one of the plurality of possible lateral locations of the wireless terminal as improbable is also based on:
(iii) the measurement of temperature at the location that is outdoors.

12. The method of claim 7 wherein all of the plurality of possible lateral locations of the wireless terminal not designated as improbable are indoors.

13. A method of estimating the lateral location of a wireless terminal, the method comprising:
receiving, at a data processing system, a measurement of a difference of a location-dependent trait of:
(1) a first radio signal as received by a wireless terminal, wherein the first radio signal is transmitted by a first transmitter at a first location, and
(2) a second radio signal as received by the wireless terminal, wherein the second radio signal is transmitted by a second transmitter at a second location, and
receiving, at the data processing system, a measurement of atmospheric pressure at the wireless terminal;
designating at least one of a plurality of possible lateral locations of the wireless terminal as improbable based on:
(i) the measurement of atmospheric pressure at the wireless terminal; and
estimating the lateral location of the wireless terminal to be one of the plurality of possible lateral locations of the wireless terminal not designated as improbable based on:
(i) the measurement of the difference of the location-dependent trait.

14. The method of claim 13 further comprising:
receiving, at the data processing system, a measurement of atmospheric pressure at a location that is outdoors; and
wherein designating at least one of the plurality of possible lateral locations of the wireless terminal as improbable is also based on:
(ii) the measurement of atmospheric pressure at the location that is outdoors.

15. The method of claim 13 further comprising:
receiving, at the data processing system, a measurement of temperature at the wireless terminal; and
wherein designating at least one of the plurality of possible lateral locations of the wireless terminal as improbable is also based on:
(ii) the measurement of temperature at the wireless terminal.

16. The method of claim 15 further comprising:
receiving, at the data processing system, a measurement of temperature at a location that is outdoors; and
wherein designating at least one of the plurality of possible lateral locations of the wireless terminal as improbable is also based on:
(iii) the measurement of temperature at the location that is outdoors.

17. The method of claim 13 wherein all of the plurality of possible lateral locations of the wireless terminal not designated as improbable are indoors.

18. A method of estimating the lateral location of a wireless terminal, the method comprising:
receiving, at a data processing system, the identity of a radio signal that is received by a wireless terminal;
receiving, at the data processing system, a measurement of temperature at the wireless terminal;
designating at least one of a plurality of possible lateral locations of the wireless terminal as improbable based on:
(i) the measurement of temperature at the wireless terminal; and
estimating the lateral location of the wireless terminal to be one of the plurality of possible lateral locations of the wireless terminal not designated as improbable based on:
(i) the identity of the radio signal.

19. The method of claim 18 further comprising:
receiving, at the data processing system, a measurement of a location-dependent trait of a radio signal as received by the wireless terminal; and
wherein estimating the lateral location of the wireless terminal to be one of the plurality of possible lateral locations of the wireless terminal not designated as improbable is also based on:
(ii) the measurement of the location-dependent trait of the radio signal.

20. The method of claim 18 further comprising:
receiving, at the data processing system, a measurement of atmospheric pressure at a location that is outdoors; and
wherein designating at least one of the plurality of possible lateral locations of the wireless terminal as improbable is also based on:
(ii) the measurement of atmospheric pressure at the location that is outdoors.

21. The method of claim 18 further comprising:
receiving, at the data processing system, a measurement of atmospheric pressure at the wireless terminal; and
wherein designating at least one of the plurality of possible lateral locations of the wireless terminal as improbable is also based on:
(ii) the measurement of atmospheric pressure at the wireless terminal.

22. The method of claim 21 further comprising:
receiving, at the data processing system, a measurement of temperature at a location that is outdoors; and
wherein designating at least one of the plurality of possible lateral locations of the wireless terminal as improbable is also based on:
(iii) the measurement of temperature at the location that is outdoors.

23. The method of claim 18 wherein all of the plurality of possible lateral locations of the wireless terminal not designated as improbable are indoors.

24. A method of estimating the lateral location of a wireless terminal, the method comprising:
receiving, at a data processing system, a measurement of a location-dependent trait of a radio signal as received by a wireless terminal;
receiving, at the data processing system, a measurement of temperature at the wireless terminal;
designating at least one of a plurality of possible lateral locations of the wireless terminal as improbable based on:
(i) the measurement of temperature at the wireless terminal; and
estimating the lateral location of the wireless terminal to be one of the plurality of possible lateral locations of the wireless terminal not designated as improbable based on:
(i) the measurement of the location-dependent trait of the radio signal.

25. The method of claim 24 wherein the step of estimating the lateral location of the wireless terminal comprises:
comparing the measurement of the location-dependent trait of the radio signal to:
(a) a first expected value of the location-dependent trait of the radio signal at a first lateral location, and
(b) a second expected value of the location-dependent trait of the radio signal at a second lateral location.

26. The method of claim 24 further comprising:
receiving, at the data processing system, a measurement of atmospheric pressure at a location that is outdoors; and
wherein designating at least one of the plurality of possible lateral locations of the wireless terminal as improbable is also based on:
(ii) the measurement of atmospheric pressure at the location that is outdoors.

27. The method of claim 24 further comprising:
receiving, at the data processing system, a measurement of atmospheric pressure at the wireless terminal; and
wherein designating at least one of the plurality of possible lateral locations of the wireless terminal as improbable is also based on:
(ii) the measurement of atmospheric pressure at the wireless terminal.

28. The method of claim 27 further comprising:
receiving, at the data processing system, a measurement of temperature at a location that is outdoors; and
wherein designating at least one of the plurality of possible lateral locations of the wireless terminal as improbable is also based on:
(iii) the measurement of temperature at the location that is outdoors.

29. The method of claim 24 wherein all of the plurality of possible lateral locations of the wireless terminal not designated as improbable are indoors.

30. A method of estimating the lateral location of a wireless terminal, the method comprising:
receiving, at a data processing system, a measurement of a difference of a location-dependent trait of:
(1) a first radio signal as received by a wireless terminal, wherein the first radio signal is transmitted by a first transmitter at a first location, and
(2) a second radio signal as received by the wireless terminal, wherein the second radio signal is transmitted by a second transmitter at a second location, and
receiving, at the data processing system, a measurement of temperature at the wireless terminal;
designating at least one of a plurality of possible lateral locations of the wireless terminal as improbable based on:
(i) the measurement of temperature at the wireless terminal; and
estimating the lateral location of the wireless terminal to be one of the plurality of possible lateral locations of the wireless terminal not designated as improbable based on:

(i) the measurement of the difference of the location-dependent trait.

31. The method of claim 30 further comprising:
receiving, at the data processing system, a measurement of atmospheric pressure at a location that is outdoors; and
wherein designating at least one of the plurality of possible lateral locations of the wireless terminal as improbable is also based on:
  (ii) the measurement of atmospheric pressure at the location that is outdoors.

32. The method of claim 30 further comprising:
receiving, at the data processing system, a measurement of atmospheric pressure at the wireless terminal; and
wherein designating at least one of the plurality of possible lateral locations of the wireless terminal as improbable is also based on:
  (ii) the measurement of atmospheric pressure at the wireless terminal.

33. The method of claim 32 further comprising:
receiving, at the data processing system, a measurement of temperature at a location that is outdoors; and
wherein designating at least one of the plurality of possible lateral locations of the wireless terminal as improbable is also based on:
  (iii) the measurement of temperature at the location that is outdoors.

34. The method of claim 30 wherein all of the plurality of possible lateral locations of the wireless terminal not designated as improbable are indoors.

* * * * *